Dec. 24, 1940.  D. F. LINSLEY  2,226,205
COMBINED VACUUM OPERATED CLUTCH AND GEARSHIFT
Filed March 24, 1932
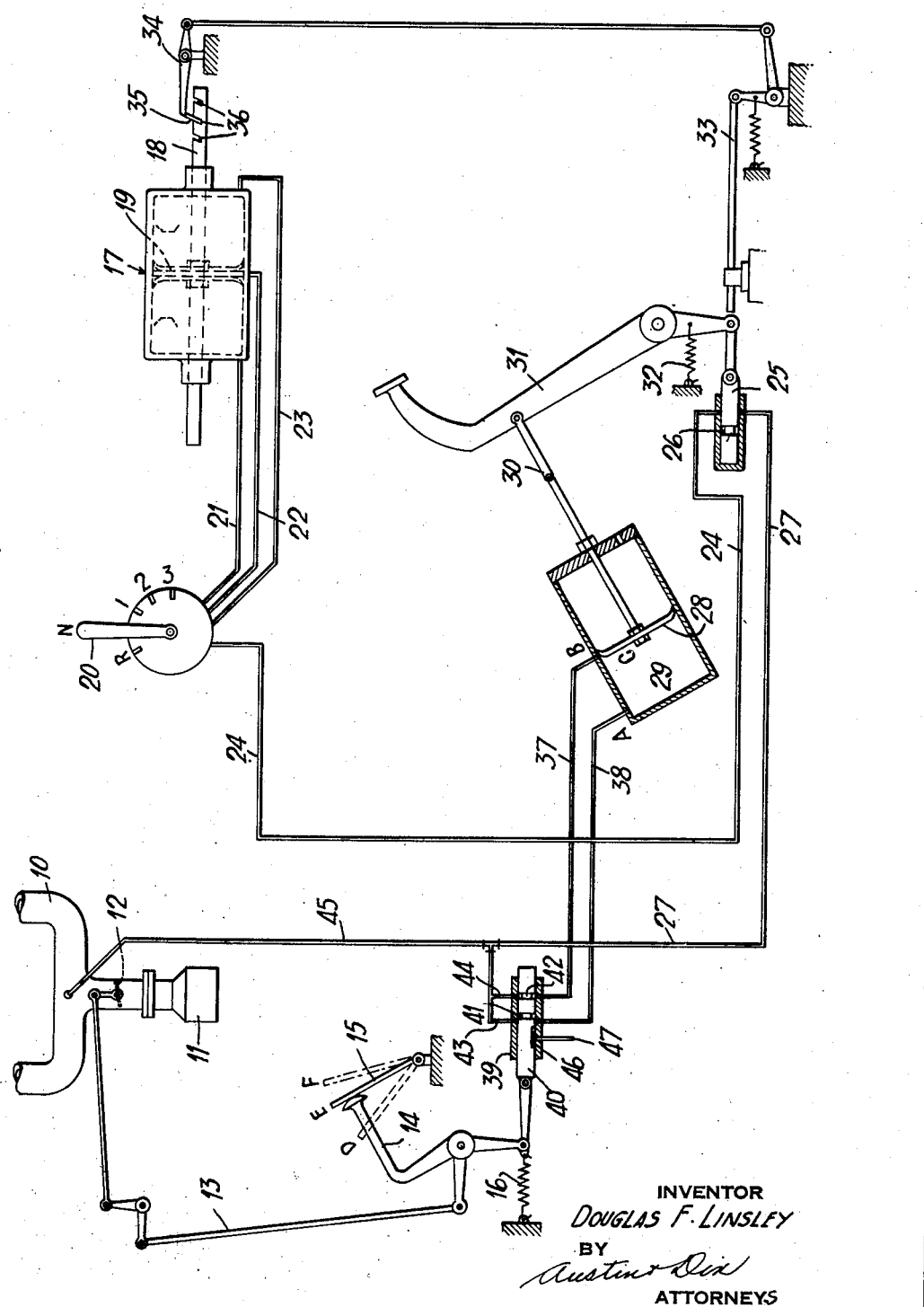
INVENTOR
DOUGLAS F. LINSLEY
BY
Austin Dix
ATTORNEYS Patented Dec. 24, 1940

2,226,205

UNITED STATES PATENT OFFICE 2,226,205

COMBINED VACUUM OPERATED CLUTCH AND GEARSHIFT

Douglas F. Linsley, Old Greenwich, Conn.

Application March 24, 1932, Serial No. 600,933

20 Claims. (Cl. 192—.01)

This invention relates to power combinations involving preferably a source of a vacuum such as an internal combustion engine, a vacuum operated clutch and cooperating vacuum operated gear shifting mechanism.

One of the main objects of the invention is to provide means for operating the clutch and for shifting gears by means of the action of the vacuum or suction produced in the intake manifold of the engine or from another source, these actions being made dependent upon the position of a fuel control element such as the pedal accelerator throttle or some other suitably operated device.

A further object is to combine these mechanisms so that the pedal throttle in one position causes the automatic actuation of the clutch to place the mechanism in the coasting condition.

A further object is to provide a correlated operation such that when the pedal acelerator is in another position the clutch is fully thrown out and the vacuum operated gear shifting mechanism is placed in condition to be operated by the manipulation of a manually controlled gear-selector element preferably disposed on or near the steering post.

A further object is to provide a combination of the above elements whereby as the operator drives the car, he first moves the selector lever of his gearshift from neutral to the gear desired which automatically shifts the gear to the desired position before he puts his foot on the throttle since when his foot is off of the throttle the vacuum operated clutch is disengaged from the engine (as will be described in detail below), after which change in the gear positions pressure on the pedal throttle will cause the clutch to be fed in properly and start the car. Thereafter any speed change desired may be achieved by moving the selector lever to the desired position and then fully releasing his foot from the pedal which release when effected will throw the clutch out and automatically cause the shift of the gears. The application of pressure to the pedal throttle thereafter will feed in the clutch automatically and cause continuance of the motion in the newly selected gear.

A still further object comprises the combination with these elements of suitable valves controlled by the accelerator pedal and by the clutch and a gearshift lock operated by the movement of the clutch to achieve these automatic actions with no further attention from the operator than the pressure on or release of the accelerator pedal and the proper positioning of the gearshift selector lever.

Further and more specific objects, features and advantages will more clearly appear from a consideration of the specification hereinafter taken in connection with the accompanying drawing which forms part of the specification and which illustrates a present preferred form of the invention.

Briefly considered and in general terms the invention includes the combination with a source of vacuum such as an internal combustion engine, either of the automotive or the marine type, of a vacuum operated clutch and a vacuum operated gearshift with means whereby the operation of the gearshift is dependent upon the clutch position. The invention further includes the feature that the position of the fuel supply element controls the operation of the gear shifting mechanism and/or the clutch mechanism.

The invention generally includes an internal combustion engine, a vacuum operated clutch and a vacuum operated gear shifting mechanism combined with a fuel supply element operated either by the foot or hand of the operator. Valve means operated by the fuel supply element and dependent upon the position of this element controls the application of a vacuum from the engine to the clutch cylinder. The full retraction of the element causes the clutch to be disengaged completely whereas the idling position of the element causes the clutch to be thrown to a coasting position. The clutch in its movement operates a valve controlling application of vacuum to the gearshift through a selector valve. When the clutch is in coasting position the vacuum is not applied to the gearshift but when the clutch is fully disengaged the vacuum is applied to the shift so that the selector valve of the shift when operated becomes effective to achieve the desired gear change. A gearshift lock is also operated by the clutch to unlock the gearshift only when the clutch is fully disengaged.

In the drawing the preferred combination of elements and their correlation is semi-diagrammatically shown in the single figure. In this figure there is illustrated a part of the engine by showing the manifold 10 leading from the carburetor 11 to the engine cylinders. In this manifold a certain amount of suction is created when the engine is running. The butterfly valve 12 is connected by suitable linkage 13 to the fuel control element or accelerator pedal 14 operated by pressure of the foot thereon or by a foot-plate 15 contacting therewith. This pedal is kept in a normal retracted position by means of spring 16.

There is also illustrated a vacuum operated gear shifting mechanism in the one cylinder 17 as shown. There is a companion identical cylinder, not observable, disposed back of the cylinder 17. Each of these cylinders has a piston rod 18 and a piston 19 therein. The piston rods are connected by suitable linkage, not shown, to the gear changing elements of the transmission box associated with the engine for effecting the proper selection of gears. The operation of this vacuum operated gearshift is effected through the proper positioning of a selector control valve or element 20 preferably on the steering post adjacent the hand of the operator. This lever has a neutral position marked N, a position for reverse marked R and positions as first, second and third gears, marked 1, 2 and 3, respectively. Suitable pipes 21, 22 and 23 extend from this selector lever to each of the cylinders 17 as shown. The operation of a preferable type of vacuum gearshift which is schematically indicated, is shown and described in detail in my Patent No. 1,733,502 issued October 29, 1929, entitled Vacuum operated gear shifter.

The selector valve also has a pipe 24 leading therefrom to a clutch controlled valve 25 which has a port 26 connecting pipes 24 and 27 together when the clutch piston 28 has been moved to the bottom of its cylinder 29 or to such position as will allow the change of gears. A link 30 connects the clutch pedal 31 with its piston 28 and the spring 32 or any other suitable means, tends to restore the clutch pedal 31 to normal position as shown. The lower end of the clutch pedal is connected by suitable linkage 33 to a lock lever 34. It will be noted that this linkage is not directly connected to the clutch pedal but bears thereagainst so that it is directly operated by the clutch pedal only when the pedal is moved to disengage the clutch. When the clutch mechanism is moved from disengaged to engaged position there is no direct contact between the clutch pedal and the linkage 33. The linkage in this instance is returned to normal position by the action of the spring shown connected thereto. Therefore, this spring will tend to move the lock lever to its engaged position as soon as the piston rods 18 are properly aligned to receive the locking dog 35 therein and not until this happens. This lock lever has a locking dog 35 thereon which is usually broad enough to extend over both piston rods 18 and to lock in one or the other of three notches such as 36 in these piston rods 18 so as to lock these rods in predetermined positions whenever the clutch pedal is in its normal position with the clutch engaged. In the preferred construction of the clutch operating cylinder 29 it is desired to include such construction and control thereof that the clutch may be moved to a "coasting" position and/or a "full" position, which latter position permits the gear shifting operation to become effective. Any suitable structure of cylinder 29 may be employed and any cooperating suitable control piping and valve arrangement for accomplishing this purpose are to be included.

The clutch cylinder 29 has two pipes 37 and 38 extending therefrom. The pipe 37 extends from a point near the middle of the cylinder and the pipe 38 extending from a point near the bottom of the cylinder. These pipes are connected to a valve casing 39 in which is disposed a slide valve 40 having ports 41 and 42 adapted to connect pipes 37 and 38, respectively, with pipes 44 and 43 which are both connected to a pipe 45 leading to the intake manifold of the engine or to any source of vacuum. The pipe 27 is also connected to pipe 45. The valve 40 also has an atmospheric port 46 therein which is adapted to connect the pipe 47 leading to the atmosphere with the pipe 38 when desired.

The position of the valve 40 as shown is the position it assumes when the fuel supply element or accelerator pedal 15 is in the idling position E. This is the position assumed when only idling gas is being fed to the engine by the throttle, but is not the ultimate retracted position of the pedal 15. This fully retracted position is indicated by the letter F and shown in dotted lines. In the position E the accelerator lever 14 will put the valve 40 in the position shown thereby connecting the manifold through pipe 45 with pipe 44. Connecting pipe 44 with pipe 37 causes a vacuum to be created in the clutch cylinder which will draw the clutch piston 28 downwardly to the point B. This will disengage the engine from the drive shaft and allow the car to coast. In this position of the valve 40, however, it will be noted that the pipe 38 and the pipe 47 are not connected, nor are the pipes 38 and 43 connected so that the clutch will not be pulled down any further. With the clutch in this coasting position it is to be observed that the valve 25 controlled by the clutch pedal 31 is not in position to connect the pipes 24 and 27 and therefore the vacuum will not be applied to the gear shifting mechanism, so that when the clutch is in the coasting position the gears cannot be shifted.

After coasting, however, if the foot is taken off of the pedal 15 entirely it will move to position F and the valve 40 will be moved further to the left than the position shown. This further movement will disengage pipes 44 and 37 but will connect pipes 43 and 38 thus applying the vacuum to the bottom of cylinder 29 and thus causing the clutch piston 28 to be drawn to the bottom of the cylinder 29. This movement will move the valve 25 to the position where the pipes 24 and 27 are connected. This connection will then place the vacuum under the control of the selector valve controlling the vacuum gear shift. It will also be observed that when the clutch piston 28 is moved to the bottom of the cylinder 29 that the piston rod lock dog 35 will be moved from whatever notches 36 they may be engaged in thus freeing the gear shift rods. This disengagement of the dog 35 from the piston rod 18 is designed to take place just before the application of vacuum to the selector valve.

When the operator then moves his selector valve by means of the lever 20 to the desired gear shift position the vacuum will instantly apply, and proper gearshift will be made. This shift is made, however, while the clutch is entirely disengaged and the foot is off the accelerator pedal. After the shift is made it is merely necessary to apply pressure to the accelerator pedal sufficiently to give the engine some gas by moving the pedal beyond the position E. This movement will restore the clutch to engaging position and engage the lock dog 35 with whatever notches 36 are in line therewith depending upon the position of the piston rods 18 and will cut off the vacuum connection between pipes 24 and 27 through the valve 25 and will also disconnect the vacuum connection between the pairs of pipes 43—38 and 44—37 and at the same time connect the atmospheric pressure through the port 46 between pipes 47 and 38 thus allowing atmospheric pressure into the lower end of the clutch cylinder and allowing the clutch to be eased properly into engagement.

After having been operated to establish one gear connection and while the car is in motion with gas being fed to the engine, the operator can pre-select a new gear connection by moving the selector lever 20 to any desired position. Nothing happens merely by this movement until the pedal 15 is allowed to move back to position F. When this fully retracted movement takes place the above operation is repeated and the desired gear connection is made, but if the pedal is only allowed to move back to position E then the clutch is alone moved to the coasting position and the gearshift is not actuated.

It will thus be observed that I have provided a simple, compact, durable, efficient economical mechanism whereby the operator through cooperative manipulation of the fuel supply element and the gearshift control lever can effect the operation of the clutch and the automatic shift of gears without the necessity either of pushing out a heavy clutch pedal or shifting a gearshift lever. It is to be further observed that the fuel supply element which is controlled by the operator and upon the position of which depends the operation of the other devices, may be the foot pedal accelerator or a hand throttle on the steering post or any other device for feeding gas to the engine. In this system it will be observed that when fuel is being fed to the engine in excess of idling supply the gears are locked and the clutch is engaged and that the gears cannot be unlocked or the gears disengaged until the fuel supply element has at least been moved back to the idling position, in which position the clutch is automatically moved to coasting position. It will be further observed that when it is desired to change gears it will be necessary to allow the fuel supply element to be moved back to a more retracted position than the idling position in order that the clutch may be moved to its most disengaged position, in which position only, the vacuum valve controlled by it will be opened to make the vacuum available for the gear shifting operation. It will also be observed that the lock of the gearshift mechanism controlled by the clutch cannot be disengaged until the clutch has been moved to its gear shifting position. It will be observed, however, that when the gears have been shifted the clutch may be restored to its engaged position regardless of whether the gears are locked or not. This locking takes place independent of the engagement of the clutch and being automatically effected by a spring action only when the gears are fully in mesh.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed is:

1. The combination of an internal combustion engine, a vacuum operated clutch, a vacuum operated gearshift, a fuel control element, means whereby the operation of the clutch is dependent upon the position of the fuel control element and valve means controlled by the clutch to make the vacuum available to the gearshift when the clutch is in a predetermined position.

2. The combination of an internal combustion engine, a vacuum operated clutch, a vacuum operated gearshift, a fuel control element, means whereby the operation of the clutch is dependent upon the position of the fuel control element and valve means controlled by the clutch to make the vacuum available to the gearshift when the clutch is in a predetermined position, and a gearshift lock controlled by the clutch and released only when the clutch is fully disengaged.

3. The combination of an internal combustion engine, a vacuum operated clutch, a fuel control element, and means operated by the movement of the element to apply vacuum to the clutch and throw it to a disengaged position when the element is in one position and to throw it to a further disengaged position when the element is in another position.

4. The combination of an internal combustion engine, a vacuum operated clutch having a clutch cylinder and a piston, a fuel control element, a valve moved by said element, and piping between the clutch, the engine intake, and the valve, and means whereby vacuum is applied only to the middle of the clutch cylinder when the element is in one position, and means whereby vacuum is applied only to the bottom of the cylinder when the element is in another position, and means to apply only atmospheric air to the cylinder when the element is in still another position.

5. The combination of an internal combustion engine, of a vacuum operated clutch, a fuel control element, and means operated by the movement of the element to throw the clutch to coasting position when the element is in one position and to throw the clutch to gear shifting position when the element is in another position.

6. The combination of an internal combustion engine, a vacuum operated clutch, a fuel control element, and means operated by the movement of said element to throw the clutch to a coasting position when the element is in a partially retracted position and to throw the clutch to gear shifting position when the element is in a fully retracted position.

7. The combination of an internal combustion engine, a vacuum operated clutch having a piston and a cylinder, a fuel control element, means to apply vacuum to the cylinder and move the piston to an intermediate position when the element is moved to idling position, means to apply vacuum to the cylinder to move the piston to the bottom of its cylinder when the element is in fully retracted position, and means to apply atmospheric air to the bottom of the cylinder when the element is moved to apply gas to the engine.

8. The combination of an internal combustion engine, a vacuum operated clutch, a vacuum operated gearshift, a fuel control element, a valve operated by the movement of the fuel control element to apply vacuum selectively to the clutch, and a valve controlled by the movement of the clutch to make the vacuum selectively available to the gearshift.

9. The combination of an internal combustion engine, a vacuum operated clutch, a vacuum operated gearshift, a fuel control element, a valve operated by the movement of the fuel control element to apply vacuum selectively to the clutch, and a valve controlled by the movement of the clutch to make the vacuum available to the gearshift, and a gearshift lock operated by the clutch and released only when the clutch is fully disengaged.

10. The combination of an internal combustion engine, a vacuum operated clutch, a vacuum operated gearshift, a fuel control element, a valve operated by the movement of the fuel control element to apply vacuum selectively to the clutch, and a valve controlled by the movement of the clutch to make the vacuum available to the gearshift, and a selector valve associated with the gearshift through which vacuum is selectively applied to the gearshift after the valve controlled by the clutch has made said vacuum available.

11. The combination of an internal combustion engine, a vacuum operated clutch, a vacuum operated gearshift, a fuel control element, a valve operated by the movement of the fuel control element to apply vacuum selectively to the clutch, a valve controlled by the movement of the clutch to make the vacuum available to the gearshift, a selector valve associated with the gearshift through which vacuum is selectively applied to the gearshift after the valve controlled by the clutch has made said vacuum available, and a gearshift lock controlled by the movement of the clutch and released only when the clutch is in fully disengaged position.

12. The combination of an internal combustion engine, a vacuum operated clutch having a cylinder and piston, a vacuum operated gearshift, a fuel control element, a valve operated by said fuel control element, piping connected between said valve, the engine, and the clutch mechanism, means whereby the clutch is moved to coasting position by the application of vacuum to an intermediate portion of the clutch cylinder when the element is in idling position, means whereby vacuum is applied to the bottom of the cylinder when the element is in fully retracted position, means whereby atmospheric air is applied to the bottom of the cylinder through said valve when the element is moved to supply gas to the engine, a valve controlled by the movement of the clutch piping connecting the engine with the gearshift through said clutch control valve, and means whereby vacuum is applied to the gearshift through said valve only when the clutch is fully disengaged.

13. The combination of an internal combustion engine, a vacuum operated clutch having a cylinder and piston, a vacuum operated gearshift, a fuel control element, a valve operated by said fuel control element, piping connected between said valve, the engine, and the clutch mechanism, means whereby the clutch is moved to coasting position by the application of vacuum to an intermediate portion of the clutch cylinder when the element is in idling position, means whereby vacuum is applied to the bottom of the cylinder when the element is in fully retracted position, means whereby atmospheric air is applied to the bottom of the cylinder through said valve when the element is moved to supply gas to the engine, a valve controlled by the movement of the clutch, piping connecting the engine with the gearshift through said clutch control valve, means whereby vacuum is applied to the gearshift through said valve only when the clutch is fully disengaged, and a gearshift lock controlled by the clutch, said lock being released only when the clutch is fully disengaged.

14. The combination of an internal combustion engine, a vacuum operated clutch having a cylinder and piston, a vacuum operated gearshift, a fuel control element, a valve operated by said fuel control element, piping connected between said valve, the engine, and the clutch mechanism, means whereby the clutch is moved to coasting position by the application of vacuum to the middle portion of the clutch cylinder when the element is in idling position, means whereby vacuum is applied to the bottom of the cylinder when the element is in fully retracted position, means whereby atmospheric air is applied to the bottom of the cylinder through said valve when the element is moved to supply gas to the engine, a valve controlled by the movement of the clutch, piping connecting the engine with the gearshift through said clutch control valve, means whereby vacuum is applied to the gearshift through said valve only when the clutch is fully disengaged, a gearshift lock controlled by the clutch, said lock being released only when the clutch is fully disengaged, and a selector valve associated with the gearshift and movable by the operator to selectively apply vacuum to the gearshift mechanism after the vacuum has been made available by the operation of the clutch controlled valve.

15. The combination with a source of vacuum of a vacuum operated clutch, a vacuum operated gearshift, a fuel control element, and means whereby the availability of the vacuum to the gear shift is dependent upon the clutch position, and whereby the clutch position is determined by the application of vacuum to the clutch mechanism through the movement of the fuel control element.

16. The combination of an internal combustion engine, a vacuum operated clutch, a vacuum operated gearshift, a fuel control element, a valve operated by the fuel control element and controlling the vacuum operated clutch, a valve controlled by the clutch and controlling the operation of the gearshift for applying vacuum to the gearshift when the clutch is disengaged.

17. The combination of an internal combustion engine, a vacuum operated clutch, a vacuum operated gearshift, a fuel control element, a valve operated by the fuel control element for controlling operation of the vacuum operated clutch and means interconnecting the vacuum operated clutch and vacuum operated gearshift for effecting operation of the gearshift after operation of the clutch.

18. In combination with a prime mover, means for controlling the power output of the prime mover, a driven mechanism, change speed gearing between the prime mover and the driven mechanism, and pneumatic devices connected with the power output controlling means whereby shifting of the change speed gearing may be automatically effected when the controlling means is adjusted to reduce the power output of the prime mover.

19. The combination with an automotive change-speed transmission and a clutch, clutch operating means, power means for operating said transmission, control means for said power means, and fluid pressure means operated by said clutch operating means for rendering said power means inoperative when the clutch is engaged.

20. In an automotive vehicle including a source of vacuum, an accelerator, a clutch and a transmission, vacuum operated power means for operating the clutch including an accelerator operated valve, and vacuum operated power means for operating the transmission including clutch operated means operative only when and if the clutch is disengaged, to permit an operation of the transmission operating power means.

DOUGLAS F. LINSLEY.